(12) United States Patent
Fleck et al.

(10) Patent No.: US 6,512,513 B2
(45) Date of Patent: Jan. 28, 2003

(54) POINTER FOR USE IN DIGITIZER SYSTEMS

(75) Inventors: David C. Fleck, Vancouver; Scott Rawlings, Camas; Konrad W. Pollmann, Vancouver, all of WA (US); Jan Hippen, Portland, OR (US); Folke Schlueter, Atherton, CA (US); Yasuyuki Fukushima, Ibaraki-ken; Masuo Hirota, Washimiya-machi, both of (JP)

(73) Assignee: Wacom Co., Ltd. (JP)

(*) Notice: Subject to any disclaimer, the term of this patent is extended or adjusted under 35 U.S.C. 154(b) by 0 days.

(21) Appl. No.: 09/110,071

(22) Filed: Jul. 2, 1998

(65) Prior Publication Data

US 2001/0043185 A1 Nov. 22, 2001

Related U.S. Application Data

(63) Continuation-in-part of application No. 09/090,307, filed on Jun. 4, 1998.

(30) Foreign Application Priority Data

Apr. 1, 1919 (JP) ............................................... 10-9325
Apr. 1, 1998 (JP) ............................................... 10-9326

(51) Int. Cl.[7] ................................................ G09G 5/00
(52) U.S. Cl. ..................................... 345/179; 178/19.01
(58) Field of Search ................................ 345/179, 180, 345/182, 183; 178/19.01, 19.02, 19.03, 19.04, 19.05, 19.06, 19.07, 18.01–18.11; D14/114

(56) References Cited

U.S. PATENT DOCUMENTS

| | | | | |
|---|---|---|---|---|
| 4,707,571 A | * | 11/1987 | Clements et al. | 178/19.01 |
| 4,823,294 A | * | 4/1989 | Rouhani | 345/179 |
| 5,004,871 A | | 4/1991 | Purcell | 178/19.04 |
| 5,014,044 A | | 5/1991 | Murray | 178/19.01 |
| 5,028,745 A | | 7/1991 | Yamanami et al. | 178/18.07 |
| 5,055,831 A | | 10/1991 | Padula | 178/19.01 |
| 5,061,828 A | | 10/1991 | Purcell | 345/173 |
| 5,109,141 A | | 4/1992 | Purcell | 178/19.04 |
| 5,317,502 A | * | 5/1994 | Reiffel et al. | 178/18.03 |
| 5,654,529 A | * | 8/1997 | Yeung et al. | 345/179 |
| 5,850,059 A | * | 12/1998 | Yoshimura et al. | 178/19.01 |
| 5,969,296 A | * | 10/1999 | Yamamoto et al. | 178/18.01 |
| D417,206 S | | 11/1999 | Hirota | D14/114 |
| 6,259,438 B1 | * | 7/2001 | Fleck et al. | 345/179 |

* cited by examiner

*Primary Examiner*—Xiao Wu
(74) *Attorney, Agent, or Firm*—Liniak, Berenato & White, LLC

(57) ABSTRACT

A digitizer pointer for use in conjunction with a digitizer system. The pointer is shaped so as to reduce finger/hand fatigue of users manipulating the pointer over and/or across a digitizer tablet. In certain embodiments, an enlarged grip area may flare toward the bottom which helps to prevent the pointer from sliding out of the user's hand. In certain other embodiments, a textured grip area is provided to improve the user's ability to hold onto and control the pointer. In yet further embodiments, a flare is provided near the tip of the pointer in order to reduce the force required by fingers of the user to manipulate and hold the pointer.

39 Claims, 4 Drawing Sheets

POINTER FOR USE IN DIGITIZER SYSTEMS

This application is a continuation-in-part (CIP) of U.S. Ser. No. 09/090,307, filed on Jun. 4, 1998, the disclosure of which is hereby incorporated herein by reference.

IMPROVED POINTER FOR USE IN DIGITIZER SYSTEMS

This invention relates to a pointer device for use in a digitizer system. More particularly, this invention relates to a digitizer stylus having improved ergonomic features for improving gripping characteristics of the pointer for a user.

BACKGROUND OF THE INVENTION

Pointer devices for use in digitizer systems are known in the art. For example, see U.S. Pat. Nos. 5,028,745; 5,055,831; 5,109,141; and 5,004,871. Each of these references discloses a pointer (e.g. stylus) for use with the digitizer system including a digitizer tablet.

Unfortunately, each of these pointers has an exterior shape which is ergonomically inefficient in design. Digitizer pointers are used by graphic artists for drawing pictures via digitizer systems on a more and more frequent basis. The above-identified pointers were designed without regard to the issue of finger/hand fatigue and drawing accuracy of potential users.

In view of the above, there exist a need in the art for an improved digitizer pointer which is designed so as to reduce finger/hand stress and allow pictures to be drawn more easily by users via a corresponding digitizer tablet.

It is a purpose of this invention to fulfill the above-described needs in the art, as well as other needs which will become apparent to the skilled artisan from the following detailed description of this invention.

SUMMARY OF THE INVENTION

Generally speaking, this invention fulfills the above described needs in the art by providing a digitizer pointer comprising:

an elongated housing;

a tip at a first end of said housing;

a mid point of said housing located equidistant between said first end and a second end of said housing;

a tapered portion of said housing at least partially located between said first end and said mid point, said tapered portion being thinner than said mid point of said housing, and wherein said tapered portion includes a thinnest part thereof;

a finger flare located between the thinnest part of said tapered portion and said tip, and wherein said finger flare flares outwardly relative to said tapered portion to a degree sufficient to reduce the amount of user finger force required to manipulate the pointer.

This invention further fulfills the above described needs in the art by providing a digitizer pointer for use with a digitizer system, the digitizer pointer comprising:

a housing;

a tip, wherein a mid-point of the pointer is located equidistant between said tip and a rear end of the pointer;

said housing defining an outer surface including an elongated rear portion, and a grip area located between the elongated rear portion and said tip;

wherein a selected cross section of said grip area defines an area substantially greater than a selected cross section of said rear portion and substantially greater than a selected cross section of said tip;

wherein a substantial part of said grip area is located between said mid point of the pointer and the tip;

wherein said grip area defines an apex which is defined as the part of the grip area positioned farthest from a first axis of the pointer; and wherein a first slope on a first side of said apex and a second slope on a second side of said apex are non-symmetrical relative to said apex in that the first and second slopes are shaped differently as they slope away from said apex.

This invention will now be described with respect to certain embodiments thereof, along with reference to the accompanying illustrations.

IN THE DRAWINGS

FIG. 1 is side plan view of a pointer according to an embodiment of this invention, this pointer simulating the shape of an airbrush, this illustration including a plurality of sectional lines therein.

FIGS. 2(a)–2(j) are cross-sectional views of the FIG. 1 pointer, taken along the corresponding sectional lines illustrated in FIG. 1.

DETAILED DESCRIPTION OF CERTAIN EMBODIMENTS OF THIS INVENTION

Figure 1:
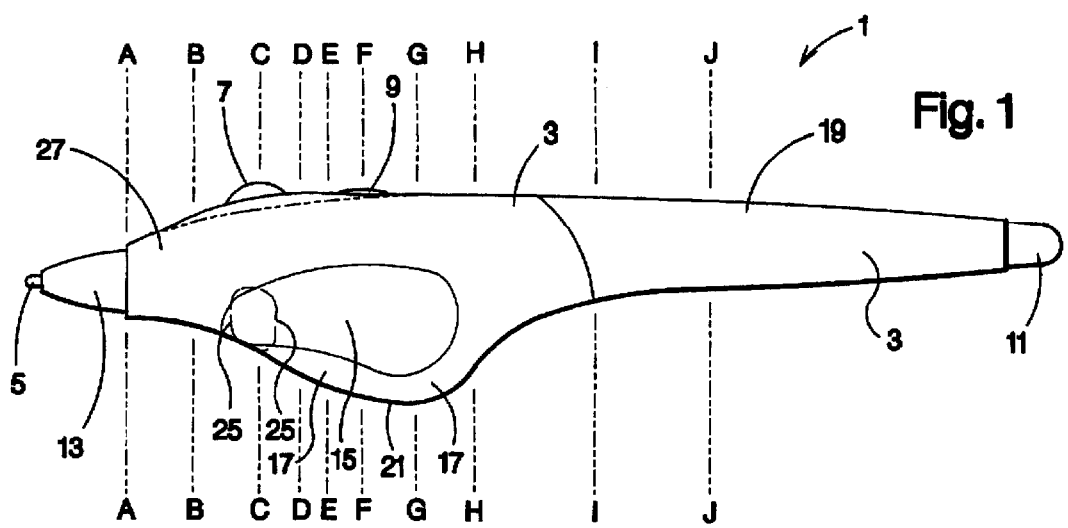

Referring now more particularly to the accompanying drawings in which like reference numerals indicate like parts throughout the several views.

FIG. 1 is a side plan view of pointer 1 in accordance with an embodiment of this invention. Pointer 1 may be used in conjunction with known digitizer systems, including digitizer tablets. Manipulation of pointer 1 on or over a digitizer tablet enables a cursor to move in a corresponding manner on a corresponding computer display screen. For example, see the digitizer system of U.S. Pat. No. 5,028,745, the disclosure of which is hereby incorporated herein by reference, which pointer 1 may be used in conjunction with.

Pointer 1 includes housing 3, pressure sensitive tip 5, finger dial/wheel 7, finger on/off clicking switch 9, eraser tip 11, front tip support 13, textured grip areas 15 disposed on both sides of the pointer, and grip area 17 which is larger than both tip support 13 and rear elongated portion 19 of the pointer. In certain embodiments, the pointer 1 is electronic in that electrical signals pass through circuitry therein. Preferably, the pointer includes a tuning circuit therein (e.g. at least a capacitor and inductive coil), as disclosed in U.S. Pat. No. 4,878,553, the disclosure of which is hereby incorporated herein by reference. Additionally, housing 3 may be a single injection molded plastic piece, or alternatively may be made up of a plurality of different and connected plastic pieces that are adhered or otherwise attached to one another. Tip 5 is pressure sensitive, in that by varying the amount of pressure applied to the tip against the corresponding digitizer writing tablet, the pen outputs a signal to the tablet that varies as a function of the pressure being applied to the tip. The tablet detects the different signals and can thus determine how much pressure is being applied to the tip. Also, the tablet based upon signals received from the pointer can also determine the degree to which the finger dial is rotated from a predetermined position and whether the on/off switch is on or off.

As it can be seen in FIG. 1 and FIGS. 2(a)–2(c) and 2(f)–2(h), non-cylindrical grip portion 17 encompasses a much greater volume (and thus has a greater cross-section) than rear portion 19 and tip support 13. For example, a cross-sectional portion of area 17, taken between the F and G sectional lines, defines an area more than twice as large as a select cross-section of tip support 13 taken in a similar cross-sectional manner. This is also the case with regard to cross-sectional areas of rear elongated portion 19 of pointer 1. The illustrated shape of grip portion/area 17 more easily enables a user to hold pointer 1 with his/her thumb and middle finger, so that the user's index finger is free to operate rotatable dial 7 and/or switch 9, independent of the pressure applied by the user to tip 5 on the tablet surface. In certain embodiments, tip support 13 may be integrally formed with housing 3, or alternatively of a separate material or separate piece.

Figure 2A:
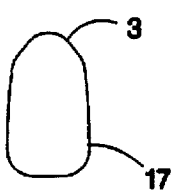
Figure 2B:
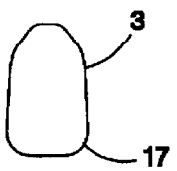
Figure 2C:
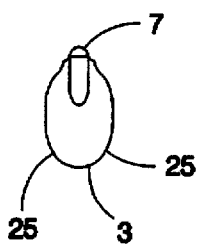
Figure 2D:
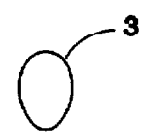
Figure 2E:
Figure 2F:
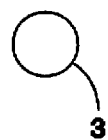
Figure 2G:
Figure 2H:
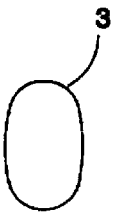
Figure 2I:
Figure 2J:
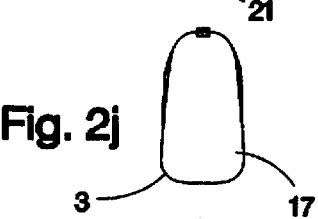
Figure 3:
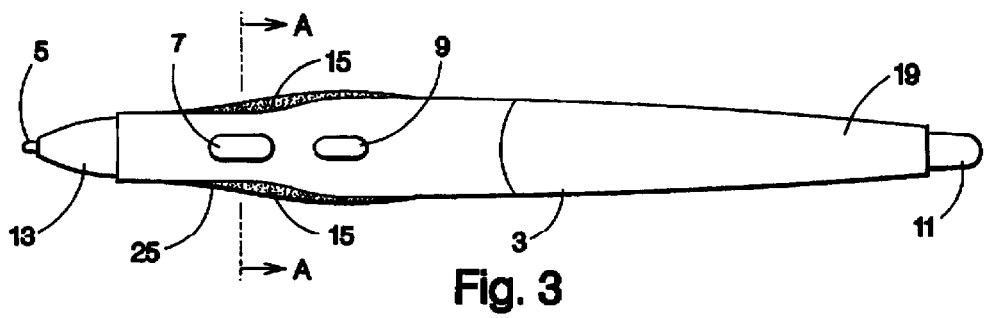
FIG. 3 is a top plan view of the pointer according to the FIG. 1 embodiment of this invention.
Figure 4:
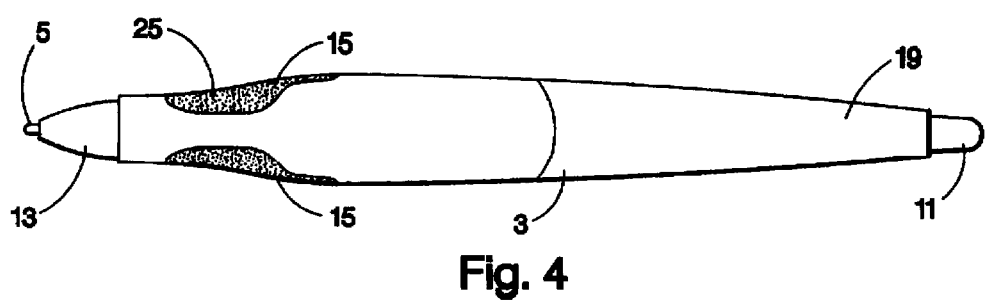
FIG. 4 is a bottom plan view of the FIGS. 1–3 pointer.
Figure 5:
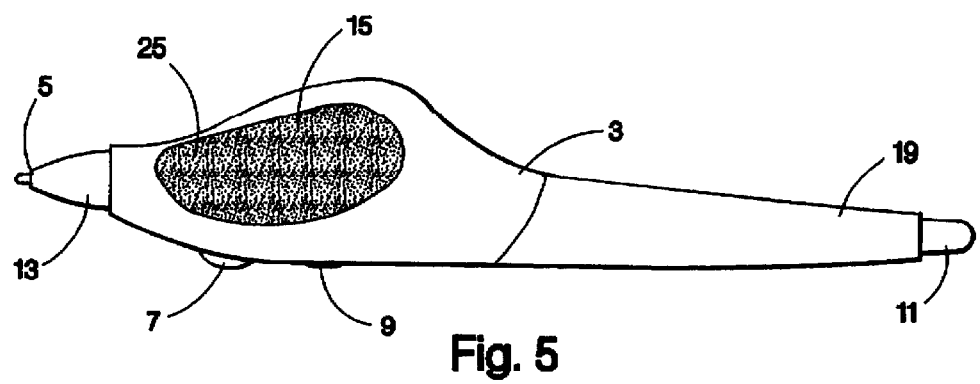
FIG. 5 is a side plan view of the FIGS. 1–4 pointer, this figure illustrating the pointer in an upside down position in that the finger dial/wheel and switch button are typically positioned on the top side of the pointer during use.
Figure 6:
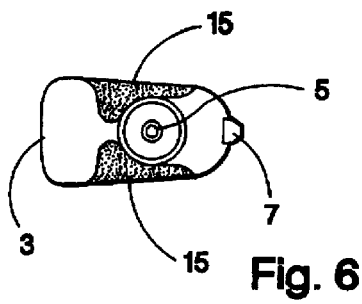
FIG. 6 is a front plan view of the FIGS. 1–5 pointer illustrating the pointer from the tip portion thereof.
Figure 8:
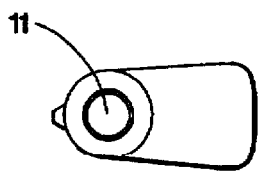
FIG. 8 is a rear plan view of the FIGS. 1–7 pointer, illustrating the rear or eraser end of the pointer.
Figure 7:
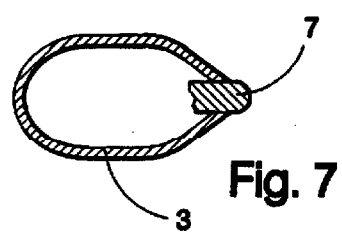
FIG. 7 is a cross-sectional view of the FIG. 3 pointer, taken along the sectional line A—A of FIG. 3.

As illustrated in FIGS. 1 and 2(c), rotatable finger dial 7 is symmetrically located in the top center of housing 3 of pointer 1. This enables dial 7 to be easily manipulated by both right and left-handed users. Grip area 17 is symmetric about a longitudinal center line of the pointer as shown in FIGS. 2(a)–2(c) and 2(h)–2(j).

However, grip area 17 is not symmetrical (i.e. non-symmetrical), as viewed in FIG. 1, with respect to, for example, section line F—F. As shown, grip area 17 slopes downwardly to a greater degree on the eraser side of section line F—F, than on the tip 5 side of section line F—F. The most downward protruding point 21 (or apex) of grip area 17 is along section line G—G, and is located rearwardly of the symmetrical center of grip area 17 (approximately at section line F—F) as shown in FIG. 1.

As illustrated in FIGS. 2(a), 2(b), 2(i), and 2(j), grip area 17 flares outwardly (i.e. becomes wider) as it extends further towards the bottom of the pointer. In other words, grip area 17 is wider at the bottom thereof (e.g. proximate lowest point or apex 21) than it is at a central point 23 thereof. This continuous increase in width of grip area 17, as it extends downwardly away from switch 9 and dial 7, makes pointer 1 easier to hold for a user. This helps to prevent the pointer from sliding out of a user's hand during normal gripping and pointer operation.

As shown in FIGS. 1 and 2(c), a recess 25 is provided on each side of pointer 1 proximate section line C—C. Recess 25 is shaped in order to minimize pressure points on a finger of the user, while simultaneously maximizing the amount of control that a user has on the position of pointer 1 on the corresponding digitizer tablet and the pressure applied to tip 5 on the tablet. To see recess 25, compare the cross-sectional view of FIG. 2(c), with that of FIG. 2(b). A portion of recess 25, on each side of pointer 1, is located directly below a portion of dial 7, and proximate a front portion of a corresponding grip area 17. Grip area 17 is the portion which is enlarged relative to rear elongated portion 19 and front portion 27 of the pointer immediately behind tip support 13.

A textured grip area 15, shown in a solid outline in FIG. 1, and in FIGS. 3—6, is provided on each side surface of pointer 1, with each textured portion at least partially being disposed in grip area 17. Textured area 15 has a roughened surface texture relative to the remainder of housing 3. This texturing improves a user's ability to easily hold and control pointer 1. This texturing may be injection molded and integrally formed with housing 3, or alternatively may be rubberized. Alternatively, the entire grip area 17 may in some embodiments be textured/rubberized. Any suitable friction causing texture may be provided in area 15 on the surface of housing 3.

Figure 9:
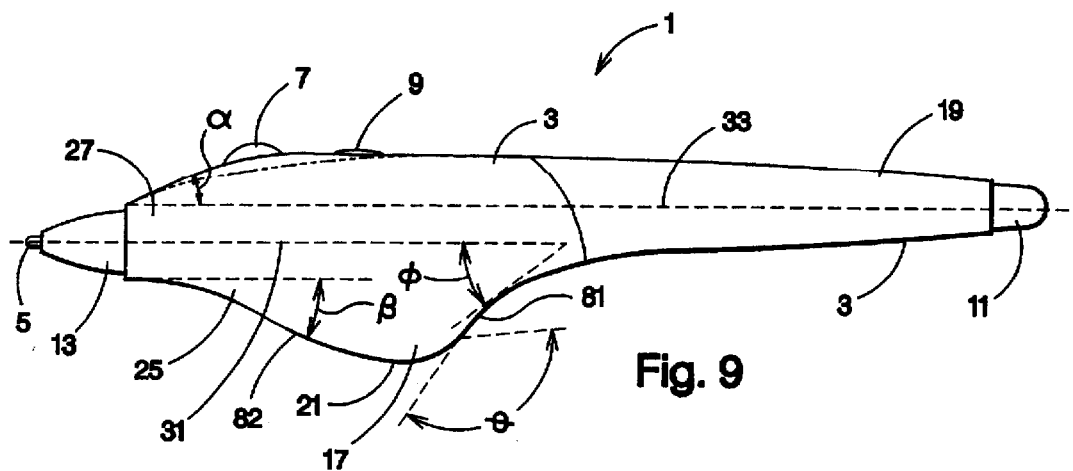
FIG. 9 is a side plan view of a pointer in accordance with the FIGS. 1–8 embodiment of this invention.
Figure 15:
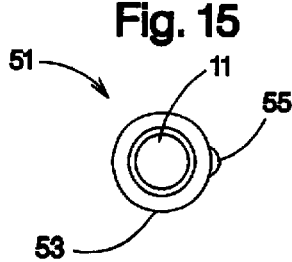
FIG. 15 is a rear plan view of the FIGS. 12–14 pointer, taken from the eraser or rear end thereof.
Figure 16:
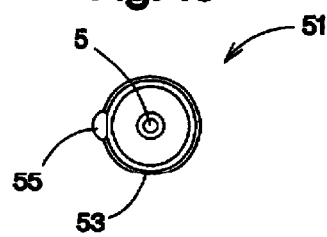
FIG. 16 is a front plan view of the FIGS. 12–15 pointer, showing the tip of the pointer.

FIG. 9 is a side plan view of pointer 1, according to the same embodiment as shown in FIGS. 1–8. As illustrated in FIG. 9, pointer 1 includes a tip or front center line or axis 31, as well as a rear center line or axis 33. Axis 31 extends through tip 5 of pointer 1. Meanwhile, axis 33 extends through eraser 11 and thus the rear end of pointer 1. Axes 31 and 33 may be parallel to one another in certain embodiments of this invention, but this not need necessarily be the case. They may be slightly angled relative to one another in alternative embodiments. In either event, axes 31 and 33 are not co-axial, but rather, are spaced from one another and offset as illustrated in FIG. 9. This offset between axis 31 and axis 33 enables tip 5 of pointer 1 to be positioned closer to the bottom portion of the pointer including recess 25 and grip area 17. Such positioning of the tip, at an elevation below the eraser as shown in FIG. 1, makes it easier for a user to apply pressure to tip 5 on the corresponding tablet.

Still referring to FIG. 9, grip area 17 includes two separate sloped portions 81 and 82. Sloped portion 81 sloped toward the apex 21 of the grip area 17 from the rear of the pointer 1, while sloped portion 82 slopes toward the apex of the grip area from the front/tip of the pointer. As illustrated, slope 82, at one location thereon, slopes toward apex 21 so as to define an angle $\beta$ relative to a plane parallel to axis 31. Thus, angles $\beta$ may also be said to be the angle which surface portion 82 slopes relative to axis 31. In certain embodiments of this invention, portion 82 slopes at an angle $\beta$ of from about 20–45 degrees, more preferably from about 25–40 degrees.

Also shown in FIG. 9 is surface portion 81 sloping at one part thereof at an angle $\theta$ relative to axis 33 and axis (or a plane parallel to axes 31 and 33), and at another part thereof at an angle $\phi$ relative to axes 31 and 33 (or a plane parallel to these axes). In certain embodiments, angle $\phi$ is from about 35–70 degrees (more preferably from about 30–50 degrees), and angle θ is from about 110–135 degrees (more preferably from about 115–125 degrees). It is noted that surfaces 81 and 82 each vary with regard to slope, and the aforesaid angles only represent portions of these surfaces. In certain embodiments, substantial portions of surfaces 81 and 82 are sloped at the aforesaid angles. The portion immediately behind and adjacent tip support 13 slopes upwardly away from the tip at an angle α of from about 15–30 degrees relative to axes 31 and 33. We now turn to another embodiment of this invention, wherein the pointer does not include a radically enlarged grip area 17. Reference is made to FIGS. 10–14.

FIGS. 12–16 illustrate a pointer 51 in accordance with another embodiment of this invention. Pointer 51 is elongated in shape, and includes tip 5, tip support 13, eraser 11, housing 53, and finger switch 55. An important aspect of this embodiment of the pointer, is the providing of tapered elongated portion 57 and outwardly flaring finger portion 59. Tapered area 57 of pointer 51 is thinner in shape than central belly portion 61 (i.e. the mid point of the pointer) of the pointer. Likewise tapered portion 57 is thinner than flared portion 59. In certain embodiments, when portions 57, 59, and 61 are annular in shape, tapered portion 57 has a diameter less than each of central portion 61 and tapered portion 59. Meanwhile, flared portion 59 is located immediately adjacent tip support 13. Flare 59 may be annular in shape, but this not necessarily need be the case in all embodiments. Portion 59, as well as portion 57, may be oval in shape in certain embodiments. Finger flare 59 becomes wider as it gets closer to tip 5 of the pointer, thereby reducing the amount of force a user needs to apply in order to hold pointer 51 and apply pressure to tip 5 via a tablet. As illustrated, flare 59 is located between tip 5 and the thinnest (or smallest diameter) part of tapered portion 57.

Figure 10:
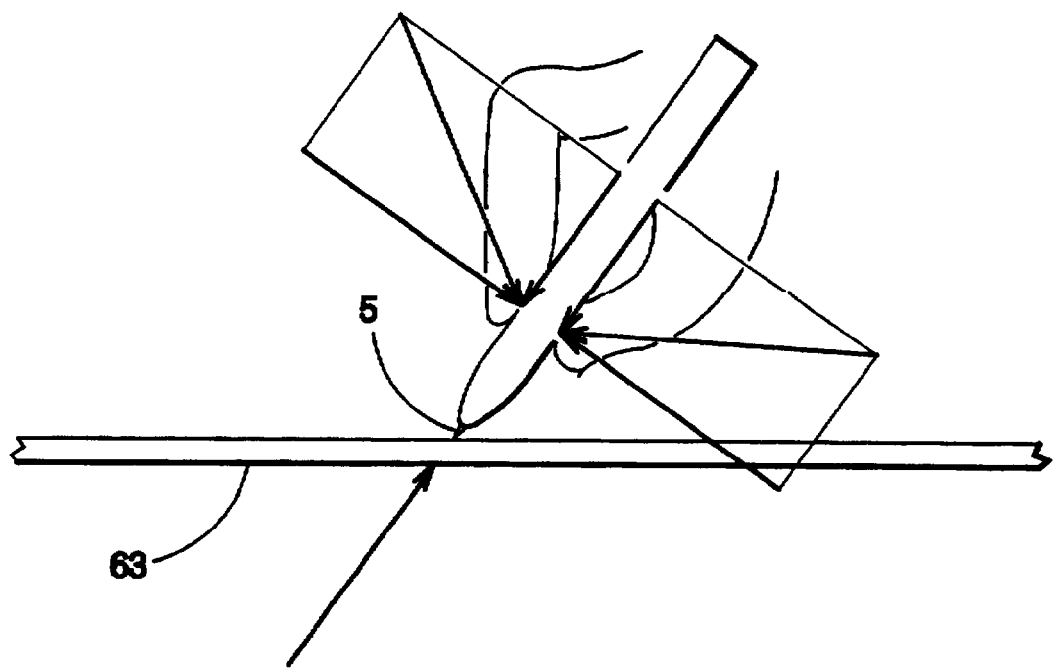
FIG. 10 is a schematic diagram illustrating the amount of finger pressure or force required to hold and manipulate a conventional digitizer pointer.
Figure 11:
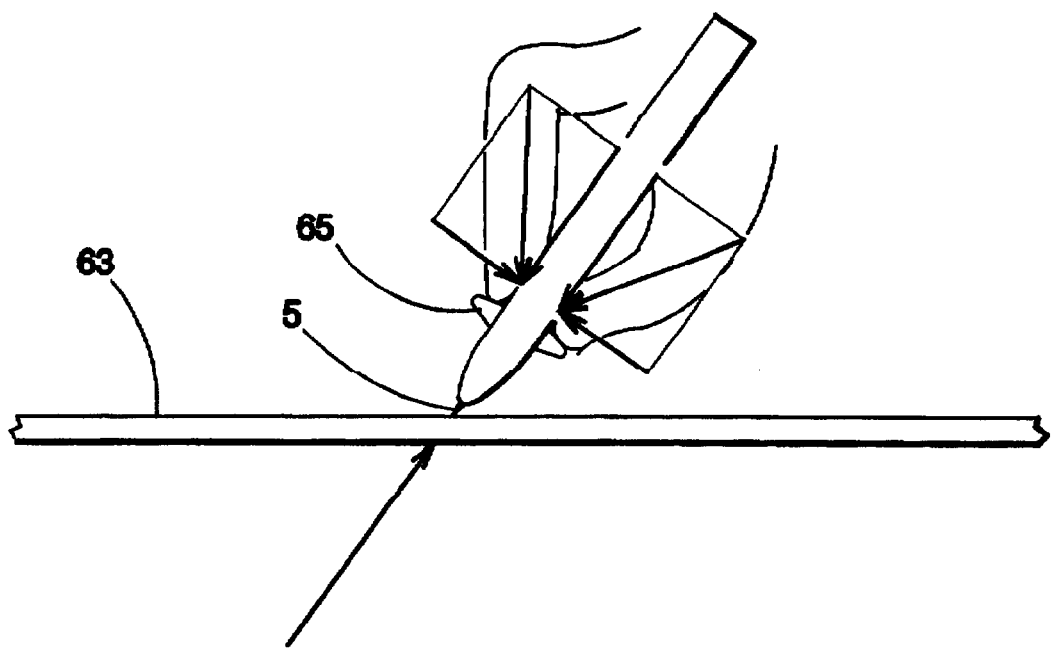
FIG. 11 is a schematic diagram illustrating the reduced amount of finger force/pressure required to manipulate a digitizer pointer including a finger flare in accordance with an embodiment of this invention, with the amount of finger force shown in FIG. 11 being much less than that shown in FIG. 10.

FIGS. 10 and 11 illustrate the reduction in finger force needed, as a result of the provision of a finger flare. FIG. 10 illustrates a conventional cigar-shaped digitizer stylus, with no finger flare. The amount of finger force needed is illustrated by the length of the illustrated arrows. As can be seen, a good bit of pinch force and total finger force is required to be applied by the user in order to hold the pointer and apply pressure to tip 5 via tablet 63. FIG. 11, on the other hand, illustrates the pointer of FIG. 10, but with a version of a finger flare 65 thereon. As can be seen in FIG. 11, due to the provision of annular finger flare 65, much less total finger force and finger pinch force is required to be applied by the user in order to apply pressure to tip 5. The advantage of finger flare 59 is thus clear. As shown in FIG. 11, finger flare 59 need not be located immediately adjacent tip 5 or tip support 13, but instead may be positioned slightly rearwardly thereof in certain embodiments of this invention.

In sum, the cylindrical pen or pointer of FIG. 10 requires strong user pinching in order to prevent the pen from slipping out of the user's fingers, raising the overall force needed to be applied by the fingers.

However, on a digitizer pen or pointer including a finger flare 59, 65, finger pinching forces are minimized because they do not have to create the friction to hold the pen or pointer in the user's hand. Instead, most of the force supplied by the user's fingers is directly passed to tip 5, thereby dramatically reducing the total force needed to be applied. This reduction in necessary finger force is an improvement in pointer ergonomics.

Still referring to FIGS. 10–11, electromagnetic waves are transmitted between the pointer and tablet as described, for example, in U.S. Pat. No. 4,878,553, thereby enabling coils in the tablet to detect the position of the pointer relative thereto (in x and y directions).

Figure 12:
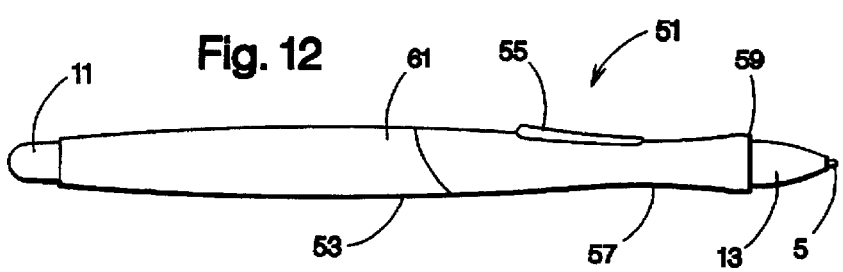
FIG. 12 is a side plan view of a pointer according to yet another embodiment of this invention.
Figure 13:
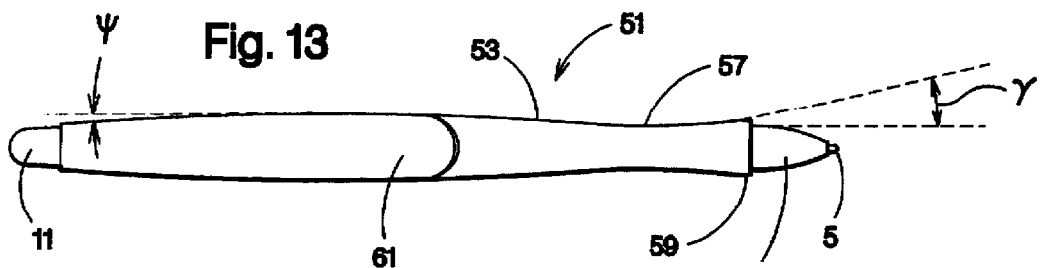
FIG. 13 is a bottom plan view of the FIG. 12 pointer.
Figure 14:
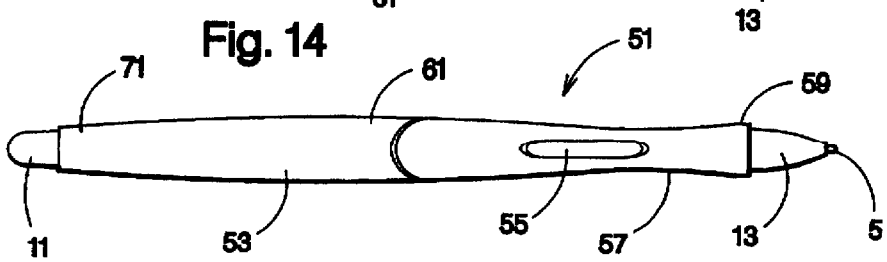
FIG. 14 is a top plan view of the FIGS. 12–13 pointer.

Referring again to FIGS. 12–16, it is noted that flare 59 is more of a gradual or tapered flare than the abrupt flare 65 of FIG. 11. Gradual flare 59, widening from the thinnest part of tapered portion 57, provides many different pen diameters or widths at the front area of the pointer. Thus, gradual flare 59, as shown in FIGS. 12–14, has the additional advantage that users may position their fingers at different locations between the thinnest part of tapered portion 57 and the largest part of flare 59, with the different locations defining different pointer diameters or thicknesses in accordance with the user's preference. Thus, there is no need to make many different pointers of different diameters or thicknesses. For example, 8 mm, 9 mm, 10 mm, and 11 mm diameters may be provided at different locations between the thinnest part of tapered portion 57 and the largest part of tapered portion 59.

It is also noted that, referring to FIGS. 12–16, from central area 61, the outer housing of pointer 51 tapers inwardly as it extends toward the rear end or eraser end 11 thereof. Thus, the belly or central area 61 of pointer 51 is larger than both rear housing area 71 and the housing area of tapered portion 57.

Still referring to FIGS. 12–14, at least a portion of finger flare 59 (and potentially the entire flare) is angled away from a central elongated axis of the pointer by an angle γ of from about 8–30 degrees, angle γ more preferably being from about 10–20 degrees between an exterior angling surface of the flare to be touched by a finger of the user and the centerline of the pointer 51. In certain embodiments, as the housing surface extends rearwardly away from mid point 61 of the pointer, it angles inwardly toward the centerline or central elongated axis of the pointer by an angle ψ which may be from about 1–10 degrees, preferably from about 2–6 degrees. Also, the surface of this pointer 51 may be textured to improve gripping characteristics, or alternatively may be smooth.

In certain embodiments, tip support 13 may be integrally formed or shaped with housing 53, or alternatively of a piece separate from but connected to the elongated housing. Housing 53 and tip support 13 may be made of plastic or any other suitable material.

Once given the above disclosure, many other features, modifications, and improvements will become apparent to the skilled artisan. Such other features, modifications, and improvements are, therefore, considered to be a part of this invention, the scope of which is to be determined by the following claims.

We claim:

1. A digitizer pointer for use with a digitizer system, the digitizer pointer comprising;
   a) a housing having first and second ends, at least said first end for engagement with a digitizing tablet;
   b) an axis extending between said housing ends, a midpoint of said housing is located equidistant said housing ends, a cross section of said housing taken along said axis being curvilinear;
   c) a finger switch disposed intermediate said first housing end and said midpoint; and
   d) a finger flare disposed intermediate said first housing end and said finger switch, wherein said cross section has an area that decreases along said axis from said finger flare to said finger switch and increases along said axis from said finger switch toward said midpoint.

2. The pointer of claim 1, wherein:
a) said finger switch is elongate and extends longitudinally along said axis.

3. The pointer of claims 2, wherein:
a) said finger switch has first end and seconds, the distance between said first finger switch end and said first housing end is greater than the distance between said second finger switch end and said first housing end, and said cross sectional area decreases along said axis from said finger flare to said first finger switch end and increases along said axis from said second finger switch end toward said midpoint.

4. The pointer of claim 3, wherein:
a) said finger switch extends radially outwardly from said housing at said second finger switch end a greater extent than at said first finger switch end.

5. The pointer of claim 3, wherein:
a) said finger switch has a longitudinally arcuate surface.

6. The pointer of claim 5, wherein:
a) said arcuate surface projects radially outwardly from said housing.

7. The pointer of claim 6, wherein:
a) said arcuate surface is concave.

8. The pointer of claim 1, wherein:
a) said housing includes a gripping portion disposed intermediate said finger flare and said midpoint, said housing being thinner at said gripping portion than at said midpoint or at said finger flare.

9. The pointer of claim 8, wherein:
a) said cross section is annular at said finger flare and said tapered portion.

10. The pointer of claim 8, wherein:
a) said cross section has an oval perimeter at said finger flare and said tapered portion.

11. The pointer of claim 8, wherein:
a) said cross section is annular.

12. The pointer of claim 11, wherein:
a) a diameter of said housing at said midpoint is no less than a corresponding diameter at said finger flare.

13. The pointer of claim 12, wherein:
a) said housing tapers along said axis from said midpoint to said second housing end.

14. The pointer of claim 1, further comprising:
a) an eraser extending from said second housing end.

15. The pointer of claim 1, wherein:
a) said finger switch is radially inwardly displaceable toward said axis.

16. A digitizer pointer for use with a digitizer system, the digitizer pointer comprising;
a) a housing having first and second ends, at least said first end for engagement with a digitizing tablet;
b) an axis extending between said housing ends, a midpoint of said housing is located equidistant said housing ends, a cross section of said housing taken along said axis being curvilinear;
c) a finger switch disposed intermediate said first housing end and said midpoint; and
d) a finger flare disposed intermediate said first housing end and said finger switch, wherein said housing includes a tapered portion disposed intermediate said finger flare and said midpoint, said housing being thinner at said tapered portion than at said midpoint or at said finger flare.

17. The pointer of claim 16, wherein:
a) said housing steplessly tapers along said axis from said finger flare to said tapered portion and from said midpoint to said tapered portion.

18. A digitizer pointer for use with a digitizer system, the digitizer pointer comprising;
a) an elongate housing having first and second ends, a top, a bottom and two opposed sides, at least said first end for engagement with a digitizing tablet;
b) an axis extending between said housing ends, a midpoint of said housing being located equidistant said housing ends, a cross section of said housing taken along said axis being curvilinear;
c) a finger switch disposed intermediate said first housing end and said midpoint on said top; and
d) first and second laterally spaced, longitudinally elongate finger grips, each one of said finger grips disposed intermediate said first housing end and said midpoint on a respective one of said two opposed sides and extending downwardly from said axis, wherein an area of said cross section increases along said axis from said first housing end to an apex intermediate said midpoint and said switch.

19. The pointer of claim 18, wherein:
a) each of said finger grips including a first finger grip end and a second finger grip end; and
b) said apex is disposed intermediate said first finger grip ends and said second finger grip ends.

20. The pointer of claim 19, wherein:
a) a cross section of said housing taken along said axis at said finger grips has a non-cylindrical shape.

21. The pointer of claim 20, wherein:
a) said finger switch is disposed intermediate said first finger grip ends and said second finger grip ends.

22. The pointer of claim 20, wherein:
a) said finger switch is disposed intermediate said first finger grip ends and said apex.

23. The pointer of claim 18, further comprising:
a) a finger wheel positioned at said top.

24. The pointer of claim 23, wherein:
a) said finger wheel is disposed intermediate said finger switch and said first housing end.

25. The pointer of claim 24, wherein:
a) said cross sectional area steplessly increases along said axis from said finger wheel to said apex.

26. The pointer of claim 18, wherein:
a) said cross sectional area at said second housing end is less than said cross sectional area at said midpoint.

27. The pointer of claim 26, wherein:
a) said cross sectional area decreases along said axis from said midpoint to said second housing end.

28. The pointer of claim 18, further comprising:
a) an eraser adjacent said second housing end.

29. The pointer of claim 18, wherein:
a) said finger switch is radially displaceable from said axis.

30. A digitizer pointer comprising:
a housing having a front portion having a first end and a second end and a rear portion having a first end connected to said front portion second end; and
a conical tip extending from said front portion first end;
said rear portion having a circular cross section between said rear portion first end and said rear portion second end; and said front portion having a circular cross section between said front portion first end and a first point and a non-circular cross section between said first point and said front portion second end.

31. The digitizer pointer of claim 30 wherein said front portion includes planar sidewall portions between said first point and said front portion second end.

32. The digitizer pointer of claim 31 wherein said planar sidewall portions are substantially parallel.

33. The digitizer pointer of claim 32 wherein said planer sidewall portions are divergent.

34. The digitizer of claim 31 including a top wall and a bottom wall connecting said planar sidewall portions.

35. The digitizer of claim 34 wherein said top wall is curved.

36. The digitizer of claim 34 wherein said top wall includes a finger wheel.

37. The digitizer of claim 34 wherein said top wall includes a push button.

38. The digitizer of claim 34 wherein said bottom wall includes first and second concave portions and a flat portion.

39. The digitizer of claim 38 wherein said flat portion is angled with respect to said front portion top wall.

* * * * *